United States Patent [19]
Nesseth

[11] 3,876,341
[45] Apr. 8, 1975

[54] TWIN CYLINDER PUMP FOR MANURE HANDLING SYSTEM

[76] Inventor: Clinton A. Nesseth, Rt. 1, Box 29, Dafter, Mich. 49724

[22] Filed: Aug. 3, 1973

[21] Appl. No.: 385,434

[52] U.S. Cl. .................. 417/515; 417/900; 119/28
[51] Int. Cl. .......................................... F04b 11/00
[58] Field of Search .......... 417/509, 510, 457, 900, 417/539, 512, 515, 516, 519, 521, 533; 119/28, 22; 222/255, 275, 278; 137/624.13; 251/251

[56] References Cited
UNITED STATES PATENTS

| | | | |
|---|---|---|---|
| 1,238,670 | 8/1917 | Holbrook | 417/510 |
| 1,560,666 | 11/1925 | Conrad | 222/255 |
| 2,151,514 | 3/1939 | Heinen | 417/510 |
| 2,284,828 | 6/1942 | Lohn | 417/520 |
| 2,319,981 | 5/1943 | Fitzgerald | 417/900 |
| 2,326,302 | 8/1943 | Linstedt | 417/510 |
| 3,027,918 | 4/1962 | Robra | 137/624.13 |
| 3,659,970 | 5/1972 | McElroy | 417/900 |

FOREIGN PATENTS OR APPLICATIONS

| | | | |
|---|---|---|---|
| 762,896 | 10/1933 | France | 417/900 |
| 261,475 | 8/1925 | United Kingdom | 417/510 |
| 914,649 | 10/1956 | United Kingdom | 119/28 |

*Primary Examiner*—William L. Freeh
*Attorney, Agent, or Firm*—Robert G. Mentag

[57] ABSTRACT

A pump for use in a manure handling system which includes a manure collection pit disposed beneath the floor of a building for receiving manure through a grate disposed over the collection pit. A pair of vertically disposed pump cylinders are operatively mounted in the collection pit, and are each provided on the lower end thereof with a discharge end which is connected through a common manifold to a manure transfer pipe for transforming the manure to an exterior storage site. Each of the pump cylinders has a longitudinally extended inlet opening one side thereof which communicates with the collection pit. A sliding gate is operatively mounted within each cylinder for opening and closing said inlet opening to permit manure to move by gravity from the collection pit into each of the cylinders when the inlet openings are open. Each of the cylinders is provided with a pump piston for forcing manure out of each cylinder after the cylinder has been filled with manure and the sliding gate moved to the closed position. Power means is connected to each of the pistons for alternately operating the pump pistons and the cylinder sliding gates. The cylinder and sliding gate structure can also be used in a single pump unit.

9 Claims, 5 Drawing Figures

3,876,341

TWIN CYLINDER PUMP FOR MANURE HANDLING SYSTEM

SUMMARY OF THE INVENTION

This invention relates generally to apparatuses for transferring manure and, more particularly, to a novel and improved pump apparatus for use in a manure handling and storage system.

Manure transfer apparatuses have been provided heretofore, as for example, the manure transfer apparatus shown in U.S. Pat. No. 3,687,311. A disadvantage of the manure transfer apparatuses shown in said patent is that it does not allow for convenient vertical operation of the manure pump means, and accordingly, cannot be positioned in a compact area. The apparatus shown in said patent also does not provide continuous transfer action and there is a loss of operating stroke of the pump piston due to the loading of the manure pump. Accordingly, in view of the foregoing, it is an important object of the present invention to provide a novel and improved pump structure which overcomes the aforementioned disadvantages of the prior art structures.

It is another object of the present invention to provide a manure transfer pump which permits manure to be loaded by gravity into the pump without any loss of stroke due to the loading action of the pump.

It is a further object of the present invention to provide a novel and improved manure pump which can be adapted for single or multiple use.

It is still another object of the present invention to provide a novel and improved pump which is simple and compact in structure, economical to manufacture, and efficient in operation.

It is still a further object of the present invention to provide a novel and improved manure pump which can be made to provide substantially continuous manure transfer action.

It is a further object of the present invention to provide a novel and improved manure pump for use in a manure transfer and storage system to be used in an animal housing building having a floor, and wherein a manure collection pit is disposed beneath the floor of said building for receiving manure removed from the floor of the building, and wherein the pump means may be vertically disposed in the collection pit. The pump means includes at least one elongated cylinder having a longitudinally extended inlet opening along one side thereof for communicating with the collection pit, to permit manure to be moved by gravity from the collection pit and through the inlet opening. A sliding gate is operatively mounted in the cylinder and is operated by power means to an open position, and operated by gravity to a closed position, and said pump means also operates a pump piston slidably mounted in the cylinder. The pump structure may include a plurality of said pumps operating in a desired and predetermined order.

Other objects, features and advantages of this invention will be apparent from the following detailed description, appended claims, and the accompanying drawings.

DESCRIPTION OF THE PREFERRED EMBODIMENTS

Figure 1:
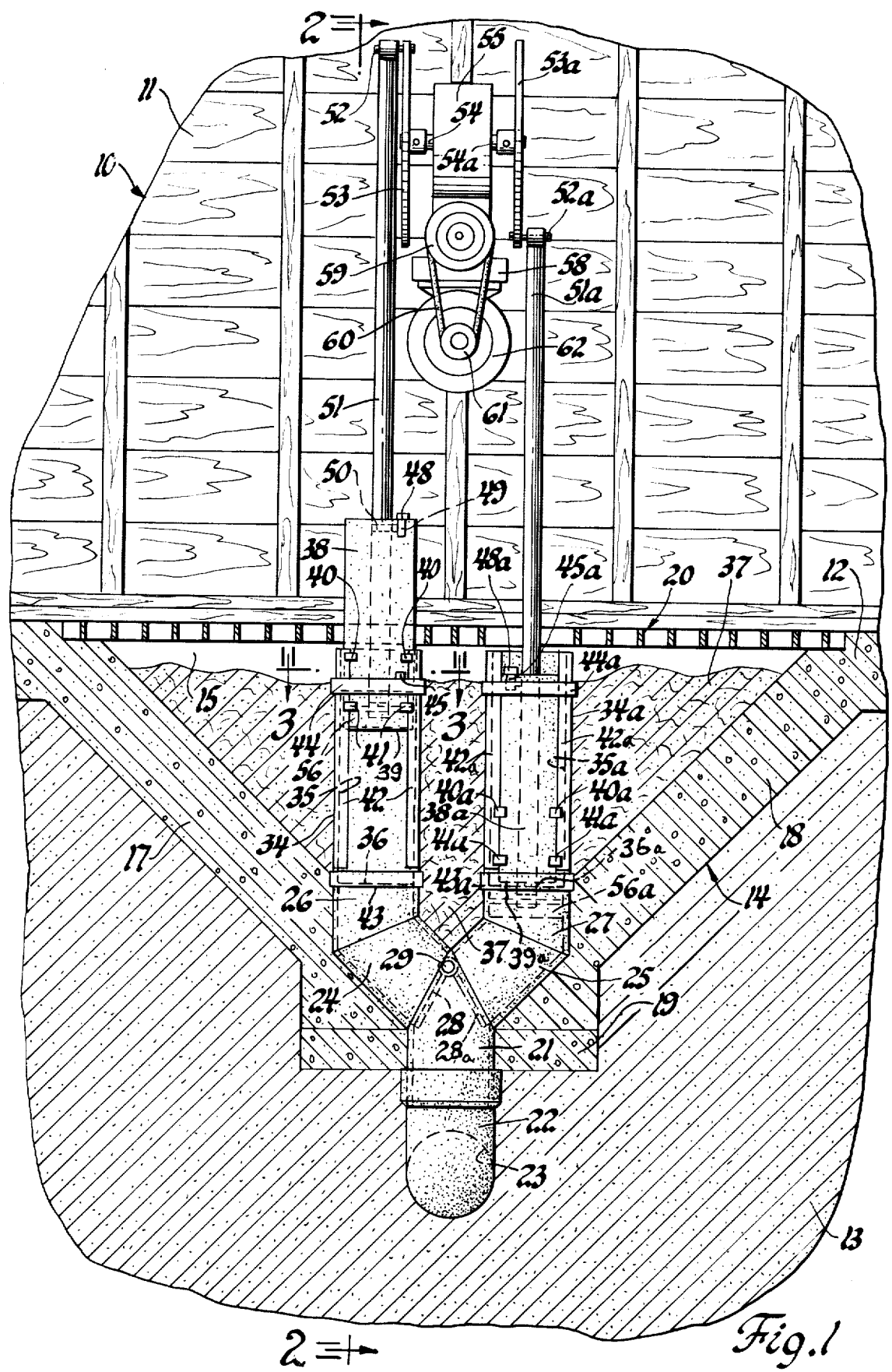
FIG. 1 is a front elevational view, partly in section, of a twin cylinder pump for a manure handling system made in accordance with the principles of the present invention, taken along the line 1—1 of FIG. 2, and looking in the direction of the arrows.
Figure 2:
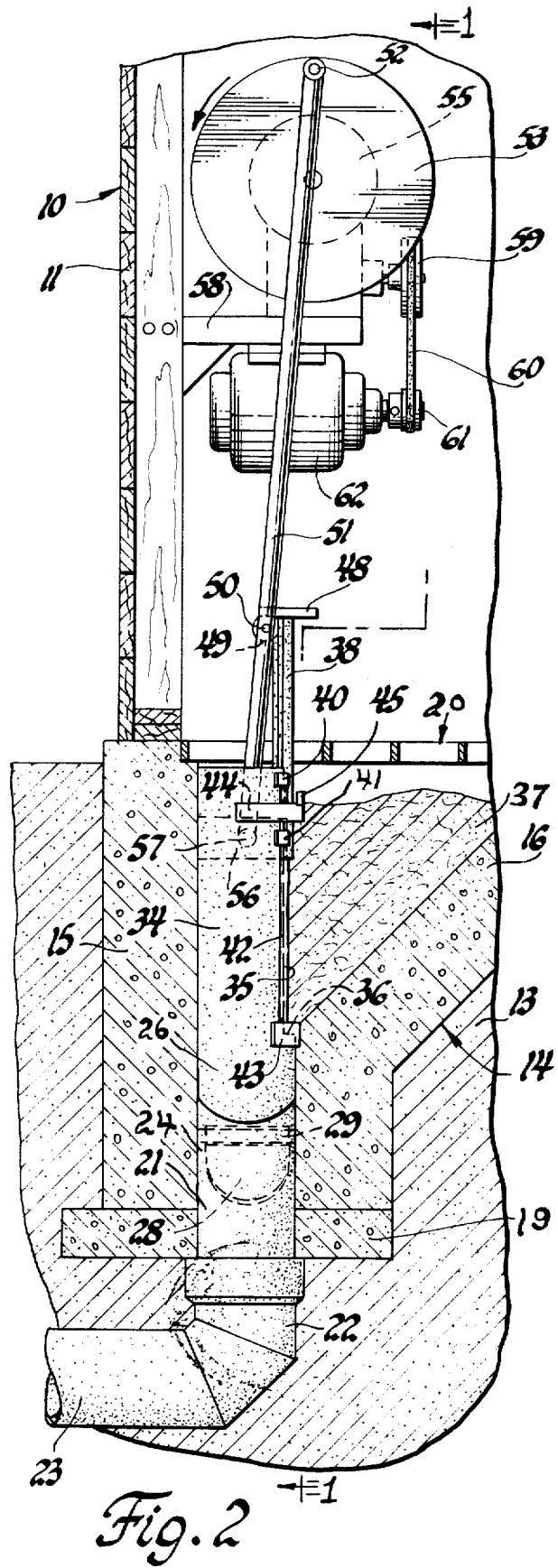
FIG. 2 is a left-side elevational view, partly in section, of the structure illustrated in FIG. 1, taken along the line 2—2 thereof, and looking in the direction of the arrows.

Referring now to the drawings, and in particular, to FIGS. 1 and 2, the numeral 10 generally indicates a fragmentary portion of a barn or other like building for housing animals. The numeral 11 indicates the building wall, and the numeral 12 in FIG. 1 indicates the cement floor in the building 10. A manure hopper or collection pit, generally indicated by the numeral 14, is shown as being formed in the ground 13 below the building floor 12. The manure collection pit 14 is open on its upper end, and it includes a rear wall 15, a front wall 16 and two side walls 17 and 18. As shown in FIG. 2, the rear wall 15 is vertically disposed while the front wall 16 and the side walls 17 and 18 slope downwardly and inwardly in a converging manner. As illustrated, the manure collection pit walls 15, 16, 17 and 18 are integrally formed with the building wall 12, and they are indicated as being formed from cement. However, it will be understood that these collection pit walls may also be made from any other suitable material, as for example, metal or the like. The collection pit 14 includes a lower end wall 19, and a removable grate pit cover 20, which covers the upper open end of the pit.

As illustrated in FIG. 1, the collection pit 14 converges downwardly towards a twin pump manifold which includes a central outlet pipe 21 that is connected to an elbow 22, which is in turn connected to a manure transfer means as the pipe 23. The manifold outlet pipe 21 is connected at its upper end to a pair of upwardly diverging manifold angle pipes 24 and 25, the upper ends of which are operatively connected to vertical manifold inlet pipes 26 and 27, respectively. As shown in FIGS. 1 and 2, a swinging gate 28 is swingably mounted on a horizontal shaft 29 so as to be swingable between the position indicated by the numeral 28 in FIG. 1, so as to close the lower end of the manifold angle pipe 24, and the position indicated by the numeral 28a, so as to close the lower end of the manifold angle pipe 25. The shaft 29 is mounted on the upper end of the pipe 21 at the junction point between the manifold angle pipes 24 and 25.

As shown in FIGS. 1 and 2, a fixed piston cylinder 34 is vertically disposed, and fixedly connected to the upper end of the manifold inlet pipe 26 by any suitable means, as by welding. A second vertically disposed piston cylinder 34a is also fixedly mounted to the upper end of the manifold inlet pipe 27. The cylinder 34 is open on the upper end thereof, and is provided on the front end thereof with a longitudinally extended rectangular opening from the open upper end of the cylinder, downwardly to the point indicated by the numeral 36 in FIG. 1. The sides of the opening are indicated by the numeral 35. As shown in FIG. 2, the opening on the front side of the cylinder 34 is disposed so that it is facing the front sloping wall 16 of the collection pit 34, so that the manure 37 in the collection pit 14 can slide by gravity through this opening and into the cylinder 34. The cylinder 34a is also similarly constructed, and it is also provided with a similar opening indicated by the numerals 35a and 36a.

Figure 3:
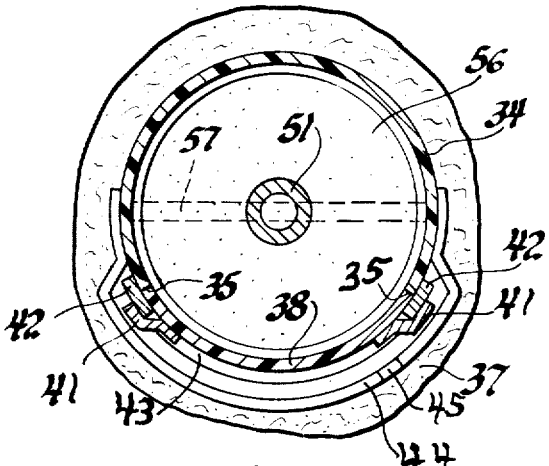
FIG. 3 is a fragmentary, enlarged, horizontal section view of the structure illustrated in FIG. 1, taken along the line 3—3 thereof, and looking in the direction of the arrows.

As shown in FIGS. 1, 2 and 3, the opening in the front side of the cylinder 34 is adapted to be enclosed by a vertically sliding gate 38 which is arcuately shaped in horizontal cross section and adapted to be slidably mounted along the side surfaces 35 of the opening in the cylinder 34. The cylinder 34a is also provided with a similar sliding gate 38a. FIG. 1 shows the gate 38 in a raised position for admitting manure 37 into the cylinder 34, and the gate 38a in a lowered position so as to enclose the cylinder 34a during a manure transfer operation.

As shown in FIG. 1, the lower ends of the sliding gates 38 and 38a are indicated by the numerals 39 and 39a, respectively. An upper pair of gate guide lugs 40 and a lower pair of gate guide lugs 41 are fixedly mounted on the sliding gate 38, and they are adapted to be slidably mounted over a pair of gate guide rails 42 which are disposed along the sides of the cylinder opening edges 35.

The gate guide rails 42 are fixedly connected to the cylinder 34 by a suitable means, as by welding. The sliding gate 38a is provided with similar guide lugs 40a and 41a and guide rails 42a.

As shown in FIGS. 1 and 2, the lower end 36 of the opening in the cylinder 34 is enclosed by an arcuate, vertically disposed lip plate 43 which is secured to the cylinder 34 by any suitable means, as by welding.

As shown in FIGS. 1 and 2, a bumper support strap 44 is fixedly mounted, as by welding, to the cylinder 34, adjacent the upper end of the opening in the side of said cylinder, and it carries on its upper end a suitable bumper 45, made of rubber or the like. A horizontal lift arm 48 is fixedly mounted, as by welding, to the upper end of the sliding gate 38. It will be seen that when the sliding gate 38 is in its lowered position, the lift arm 48 will engage the bumper or stop 45, and keep the gate 38 from falling by gravity all the way down, so as to have its lower end hit the opening lower edge 36 in the side of the cylinder 34. The function of the lip plate 43 is to overlap and enclose the opening which is formed between the lower end 36 of the cylinder opening, and the lower end 39 of the sliding gate 38 when the sliding gate 38 is in a lowered position. The cylinder 34a is provided with similar structure, as shown in FIG. 1.

It will be seen that the cylinders 34 and 34a form a part of two pump means. As shown in FIG. 1, a vertically movable solid pump piston 56 is operatively mounted in the cylinder 34, and a similar pump piston 56a is mounted in cylinder 34a. As best seen in FIG. 2, the piston 56 is pivotally mounted to the lower end of an elongated connecting rod 51 by a wrist pin 57 and any suitable bearing means. The connecting rod 51 carries a horizontal roller shaft 50 on which is rotatably mounted a lift roller 49. It will be seen that as the connecting rod 51 moves the piston 56 upwardly, the lift roller 49 will engage the lower face of the lift arm 48 and carry the lift arm 48 and sliding gate 38 upwardly to the open position shown in FIG. 2. Continued movement of the connecting rod 51 moves the roller to the left, as viewed in FIG. 2, and out from under the lift arm 48 so as to permit the sliding gate 38 to drop by gravity down to a closed position, as illustrated by the gate 38a in FIG. 1.

As shown in FIGS. 1 and 2, the upper end of the connecting rod 51 is rotatably mounted on a shaft 52 which is carried on the outer vertical face of a first drive wheel 53. As shown in FIG. 1, the drive wheel 53 is operatively mounted on the output shaft 54 of a gear reducer drive means 55. The gear reducer drive means 55 is operatively mounted on a platform 58 which is fixed by any suitable means on the inside of the building wall 11. The gear reducer means 55 has an input shaft on which is operatively mounted a driving pulley 59 around which is trained a V-belt 60. The V-belt 60 is also trained around a drive pulley 61 which is operatively mounted on the output shaft of a suitable electric drive motor 62. As shown in FIG. 1, the piston 56a is operatively connected by a connecting rod 51a, and to the gear reducer drive means 55, in the same manner as the piston 56. The connecting rod 51a is pivotally mounted on a shaft 52a carried on the outer vertical face of a second drive wheel 53a which is operatively mounted on a second output shaft 54a of a gear reducer drive means 55. As shown in FIG. 1, the connecting rod drive shafts 52 and 52a are disposed 180° apart, and eccentrically mounted on the drive wheels 53 and 53a so that as said wheels rotate, they will alternately operate the two pump means.

In use, the manure 37 is scraped or pushed over the grate 20, and it then falls by gravity into the collection pit 14. When the electric motor 62 is energized, it will operate the gear reducer drive means 55 so as to rotate the drive wheels 53 and 53a in a counterclockwise direction, as viewed in FIG. 2. Assuming that the piston 56 is at the bottom of its stroke, it will be seen that the connecting rod drive shaft 52 will be in a position 180° moved counterclockwise from the position shown in FIG. 2, so as to assume substantially the same angular position shown in FIG. 2 and to bring the roller 49 under the lift arm 48. Continued counterclockwise movement of the drive wheel 53 will move the connecting rod upwardly, and it will simultaneously carry the roller 49 and lift arm 48 upwardly to move the sliding gate 38 to the raised open position shown in FIG. 2.

The manure 37 in the pit 14 will move by gravity through the opening in the side of the cylinder 34. Continued rotation of the drive wheel 53 causes the connecting rod 51 to pivot about the wrist pin 57 and move the connecting rod to the left, as viewed in FIG. 2, so as to move the roller 49 out from under the lift arm 48. The gate 38 then drops by gravity downwardly to the closed position. Continued rotation of the drive wheel 53 moves the piston 56 downwardly to force the manure trapped in the cylinder 34 downwardly into the manifold inlet pipes 26 and 24. The pressure in the manifold pipe 24 will swing the gate 28 to the position marked 28a in FIG. 1, and the manure in the cylinder 38 will be forced downwardly and into the transfer means or pipe 23. Simultaneously, the piston 56a is operated alternately in the same manner, but in a position whereby when the piston 56 approaches its lowest position and it stops forcing manure from the cylinder 34, the piston 56a is initiating its downward pressure movement to force manure through the manifold inlet pipes 27 and 25 so as to swing the gate 28 from the position marked 28a in FIG. 1 to the position marked 28 to permit the manure to flow from the manifold pipe 25 and into the transfer pipe 23.

The cylinders 34 and 34a are loaded with manure when the pump pistons 56 and 56a are alternately moved upwardly, and said cylinders are discharged of the manure when said pistons are alternately moved downwardly. The lower end of the swinging gate 28 is circular and it is designed to alternately abut the lower ends of the manifold pipes 24 and 25, to open and close the same.

It will be seen that the double pump means of the present invention may be mounted against a vertical wall of a building, and this is an advantage since it provides a pump of large capacity which can be positioned in a compact area. It will also be seen that the pressure in the transfer means or pipe 23 is substantially continuous because of the continuous alternate action of the double pump means. The substantially continuous pressure on the manure and transfer means 23 provides an apparatus which eliminates any back pressure on the driving pump means, because the weight of the manure in the transfer means 23 is not stopped during the pumping action. It will be understood, that the pistons 56 and 56a may be of any desired cross section. They are illustrated as being round, but it will be understood that they could be square or have any other desired cross sectional shape.

Figure 4:
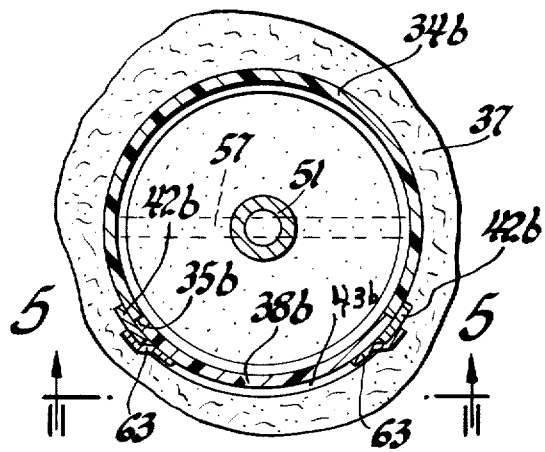
FIG. 4 is a fragmentary, horizontal section view, similar to FIG. 3, but showing a modification of the sliding gate guide means.
Figure 5:
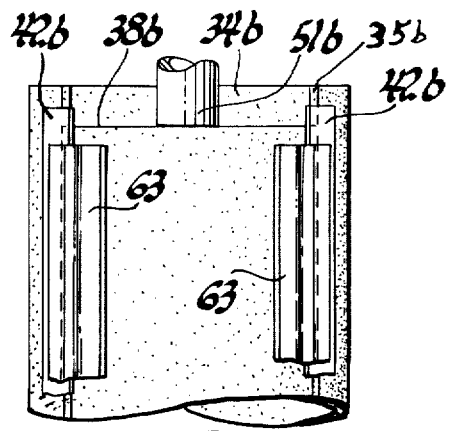
FIG. 5 is a front elevational view of the structure of FIG. 4, taken along the line 5—5 thereof, and looking in the direction of the arrow.

FIGS. 4 and 5 illustrate a second embodiment of the invention, in which the sliding gate guide lugs are constructed differently. The parts of the embodiment of FIGS. 4 and 5 which are the same as the embodiment of FIGS. 1, 2 and 3 are marked with the same reference numerals, followed by the small letter b. It will be seen in FIG. 5, that instead of the upper pair of lugs 40 and lower pair of lugs 41 as employed in the first embodiment, an elongated lug 63 is fixedly secured to the sliding gate 38b along each of the sides thereof. Each of the elongated lugs 63 is slidably mounted over the lip plates 42b. The embodiment of FIGS. 4 and 5 functions in the same manner as the previously described embodiment of FIGS. 1, 2 and 3.

It will be understood that the vertical cylinder and sliding gate structure may be incorporated in a single pump unit for connection directly to a manure transfer pipe.

While it will be apparent that the preferred embodiments of the invention herein disclosed are well calculated to fulfill the objects above stated, it will be appreciated that the invention is susceptible to modification, variation and change.

What is claimed is:

1. In a manure transfer and storage system, used in an animal housing building, having a floor, the combination comprising:
   a. a manure collection pit disposed beneath the floor of said building for receiving manure removed from the floor of said building;
   b. at least one pump means operatively mounted in said collection pit and having a discharge end connected to a transfer means for transferring manure from said collection pit to the exterior of the building;
   c. power means for operating said pump means; and,
   d. said pump means including a vertically disposed elongated cylinder having a longitudinally extended vertical inlet opening along one side thereof and communicating with said collection pit, and a vertically movable sliding gate for opening and closing said inlet opening to permit manure to move by gravity from the collection pit through said inlet opening into the cylinder when the sliding gate is moved to an open position, and said sliding gate being moved to a raised open position by said power means and to a lowered closed position by gravity.

2. A manure transfer and storage system, as defined in claim 1, including:
   a. at least two pump means which are operated alternately by said power means.

3. A manure transfer and storage system, as defined in claim 2, including:
   a. a manifold having a separate inlet pipe connected to the discharge end of each of said pump means, and an outlet pipe connected to said transfer means; and,
   b. a gate valve means operatively mounted in said manifold for alternately communicating each of the manifold inlet pipes with said manifold outlet pipe.

4. The manure transfer and storage system as defined in claim 2, wherein:
   a. each of said pump cylinders is vertically disposed in laterally spaced apart positions.

5. The manure transfer and storage system as defined in claim 4, wherein:
   a. each of said pump means includes a piston slidably mounted in its respective cylinder; and,
   b. said power means includes a first connecting rod having one end operatively connected to one end of said pistons, a second connecting rod having one end operatively connected to the other end of said pistons, and means for operating said connecting rods to alternately operate said pistons in said cylinders.

6. The manure transfer and storage system as defined in claim 5, wherein:
   a. said means for operating said connecting rods includes an eccentric means.

7. The manure transfer and storage system as defined in claim 6, wherein:
   a. said power means includes a gear reducer means having an output shaft means operatively connected to said eccentric means for operating said eccentric means; and,
   b. an electric motor for driving said gear reducer means.

8. In a manure transfer and storage system, used in an animal housing building, having a floor, the combination comprising:
   a. a manure collection pit disposed beneath the floor of said building for receiving manure removed from the floor of said building;
   b. at least two pump means operatively mounted in said collection pit and having a discharge end connected to a transfer means for transferring manure from said collection pit to the exterior of the building;

c. power means for operating said pump means;

d. said pump means including an elongated cylinder having a longitudinally extended inlet opening along one side thereof and communicating with said collection pit, and a sliding gate for opening and closing said inlet opening to permit manure to move by gravity from the collection pit into the cylinder when the inlet opening is open, and said sliding gate being moved to an open position by said power means and to a closed position by gravity;

e. said two pump means being operated alternately by said power means;

f. each of said pump cylinders being vertically disposed in laterally spaced apart positions;

g. each of said pump means including a piston slidably mounted in its respective cylinder;

h. said power means including a first connecting rod having one end operatively connected to one end of said pistons, a second connecting rod having one end operatively connected to the other end of said pistons, and means for operating said connecting rods to alternately operate said pistons in said cylinders;

i. each of said sliding gates being provided with a lift arm; and, j. each of said connecting rods being provided with a lift roller for engagement with the lift arm on the sliding gate of the respective cylinder in which the connecting rod is operated for moving the sliding gate to which the lift arm is attached from a closed lower position to a raised open position, and for disengagement from said lift arm after the lift arm and its respective gate has been raised to said open position.

9. The manure transfer and storage system as defined in claim 8, wherein:

a. each of said cylinders is provided with a resilient stop means for engagement by the lift arm on the sliding gate in each respective cylinder when said gate falls downwardly by gravity to said closed position.

* * * * *